(12) United States Patent
Tanaka et al.

(10) Patent No.: US 7,923,143 B2
(45) Date of Patent: Apr. 12, 2011

(54) BATTERY SEPARATOR AND BATTERY COMPRISING SAME

(75) Inventors: Masanao Tanaka, Kazo (JP); Toshiaki Takase, Koga (JP); Yasuhiro Ito, Shiraoka-machi (JP); Yoshihiko Kondo, Nogi-machi (JP)

(73) Assignee: Japan Vilene Company, Ltd., Tokyo (JP)

( * ) Notice: Subject to any disclaimer, the term of this patent is extended or adjusted under 35 U.S.C. 154(b) by 1231 days.

(21) Appl. No.: 11/340,095

(22) Filed: Jan. 26, 2006

(65) Prior Publication Data

US 2006/0194100 A1   Aug. 31, 2006

(30) Foreign Application Priority Data

Jan. 26, 2005   (JP) .................. 2005-018940

(51) Int. Cl.
  *H01M 2/18*   (2006.01)
  *H01M 2/16*   (2006.01)
  *D04H 1/00*   (2006.01)
(52) U.S. Cl. .................. 429/142; 429/254; 442/337
(58) Field of Classification Search .................. 429/142, 429/254; 442/337
See application file for complete search history.

(56) References Cited

U.S. PATENT DOCUMENTS

| 7,402,539 B2 * | 7/2008 | Takase et al. ................ 442/341 |
| 2002/0090876 A1 | 7/2002 | Takase et al. | |

FOREIGN PATENT DOCUMENTS

| GB | EP 0 921 580 | 6/1998 |
| GB | EP 1 079 448 | 2/2001 |
| GB | EP 0 834 938 | 2/2002 |
| JP | 57176665 | 10/1982 |
| JP | 57176666 | 10/1982 |
| JP | 10-251953 | 9/1998 |
| JP | 2002110130 | 4/2002 |
| JP | 2002-180330 | 6/2002 |
| JP | 2002231210 | 8/2002 |

* cited by examiner

Primary Examiner — Ula C. Ruddock
Assistant Examiner — Thomas H. Parsons
(74) Attorney, Agent, or Firm — Heslin Rothenberg Farley & Mesiti P.C.

(57) ABSTRACT

A battery separator comprising a nonwoven fabric, wherein the nonwoven fabric contains (1) superfine fibers having a fiber diameter of 3 μm or less, (2) noncircular fine fibers having a noncircular cross-sectional shape and having a fiber diameter of 3 to 5 μm (excluding 3 μm), the fiber diameter meaning a diameter of a circle having an area the same as that of the noncircular cross-sectional shape, and (3) polypropylene based high-strength composite fibers containing a fusible component on the surface thereof and having a tensile strength of 4.5 cN/dtex or more, and the fusible component contained in the polypropylene based high-strength composite fibers is fused, and a battery comprising the battery separator are disclosed. A battery separator of the present invention has a high electrolyte-holding capacity and is capable of effectively preventing a short circuit, even if the separator is designed to be thinner to enhance the capacity of a battery.

20 Claims, 3 Drawing Sheets

F I G. 1
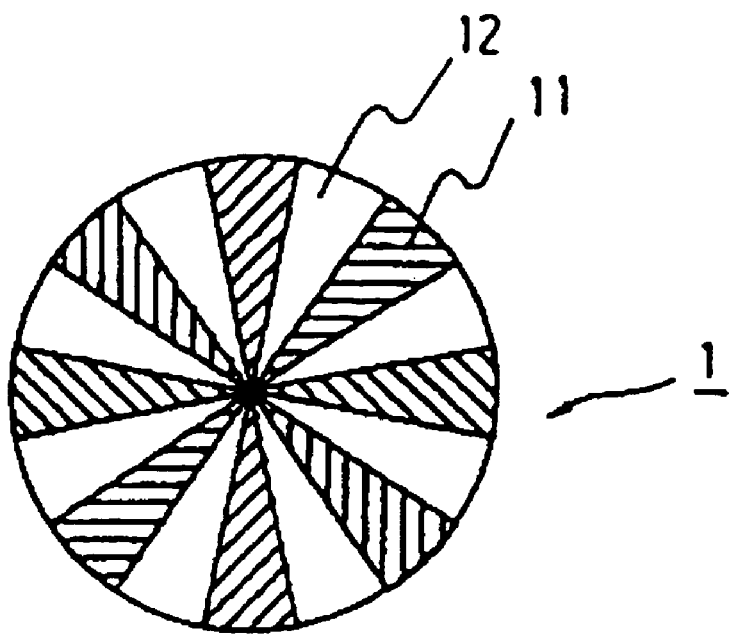
F I G. 2
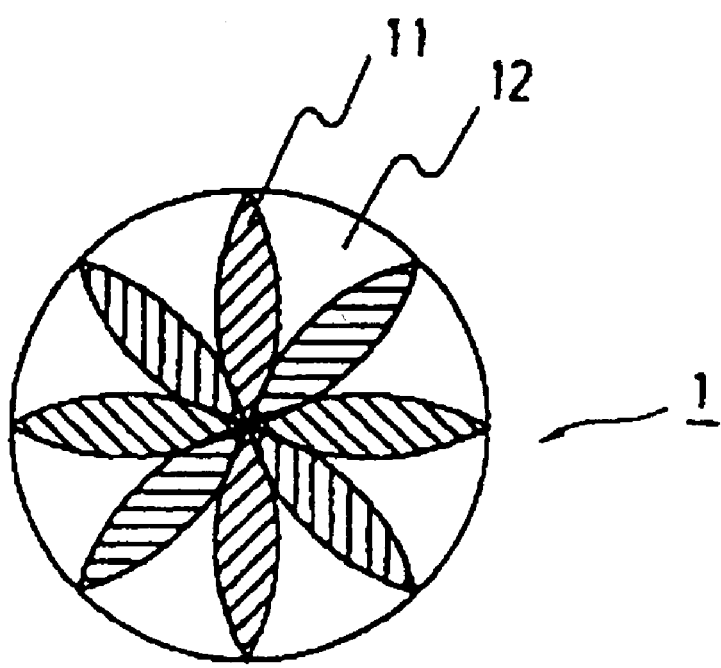

BATTERY SEPARATOR AND BATTERY COMPRISING SAME

CROSS-REFERENCE TO RELATED APPLICATION

This application is a U.S. non-provisional application, which claims priority from Japanese patent application, serial number 2005-018940, filed Jan. 26, 2005. The entire disclosure is incorporated herein by reference.

FIELD OF THE INVENTION

The present invention relates to a battery separator and a battery comprising the battery separator.

BACKGROUND OF THE INVENTION

In a battery, a separator is used to separate a positive electrode and a negative electrode, to prevent a short circuit therebetween, and further, to hold an electrolyte thereon and enable a smooth electromotive reaction.

Recently, a space allotted in electronic equipment for the battery has become smaller, due to the need for miniaturization and weight-saving. Nevertheless, the performance requirement for such a smaller battery is the same as or higher than that for a conventional battery, and therefore, it is necessary to enhance the capacity of the battery, and to increase the amounts of active materials in the electrodes. Accordingly, a volume allotted in the battery for the separator must be reduced. Although a thin separator having a thickness of 0.15 mm has been proposed, a thinner separator having a thickness of 0.1 mm or less is desired.

As such a separator, Japanese Unexamined Patent Publication (Kokai) No. 2002-124239 discloses "a battery separator consisting essentially of a nonwoven fabric having a substantially unilayered structure, wherein an apparent total surface area of fibers per a surface density of the nonwoven fabric is 20 m$^2$ or more, a thickness of the nonwoven fabric is 0.1 mm or less, a uniformity index of the nonwoven fabric is 0.15 or less, and the nonwoven fabric contains superfine fibers having a fiber diameter of 4 µm or less" (for example, claims 1, 3, and 4).

The battery separator disclosed in JP 2002-124239 contains superfine fibers having a fiber diameter of 4 µm or less. Therefore, the separator has a wide apparent total surface area of fibers per a surface density, and can provide a separator having an excellent electrolyte-holding capacity, even though the separator is thin. In this connection, JP 2002-124239 discloses that the superfine fiber may be formed from an island component remaining after removing a sea component from an islands-in-sea type composite fiber. It is disclose that the separator disclosed in JP 2002-124239 preferably contains high-modulus fibers having a Young's modulus of 50 cN/dtex or more, because a short circuit caused by a tear in the separator by an edge of an electrode or a penetration into the separator by a flash at the electrode, when the separator is wrapped around the electrodes, will be avoided.

Japanese Unexamined Patent Publication (Kokai) No. 10-251953 discloses "a nonwoven fabric characterized in that, at least, superfine fibers A generated from removal-type dividable fibers capable of generating superfine fibers A having an average fiber diameter of 3 µm or less by removing one or more resin components; physically dividable fibers capable of generating superfine fibers B by dividing the fibers by a physical action; and the superfine fibers B generated from the physically dividable fibers are entangled and unified" (claim 1). JP 10-251953 further discloses that the nonwoven fabric may contain adhesive composite fibers (paragraph [0036]), and that the nonwoven fabric may be used as a battery separator (paragraph [0051]).

However, when the nonwoven fabric is used as a battery separator having a thickness of 0.1 mm or less, a short circuit caused by a tear in the separator by an edge of an electrode or a penetration into the separator by a flash at the electrode, when the separator is wrapped around the electrodes, easily occurs. Further, the nonwoven fabric prepared via the entangling treatment has a large maximum pore size, and thus a short circuit caused by a movement of electrode active materials in a battery is liable to occur when the battery is used.

Japanese Unexamined Patent Publication (Kokai) No. 2002-180330 discloses "a drawn composite fiber generated by drawing undrawn composite fiber spun by a melt spinning method and having a core component of a crystalline propylene based polymer and a sheath component of an olefin polymer other than the crystalline propylene based polymer, wherein a breaking strength of the drawn composite fiber is more than 5.74 cN/dTex, an elongation percentage thereof is 30% or less, and a Young's modulus thereof is 43.1 cN/dTex or more" (claim 1). JP 2002-180330 further discloses that the drawn composite fiber may be used as a battery separator (paragraph [0001]).

However, JP 2002-180330 does not disclose fibers other than the drawn composite fiber in use as the battery separator. The battery separator could not be produced with the drawn composite fiber alone.

SUMMARY OF THE INVENTION

To manufacture a thin battery separator having a thickness of 0.1 mm or less and a mass per unit area of 50 g/m$^2$ or less, it is preferable to widen an apparent total surface area of fibers per a surface density (mass per unit area) by increasing an amount of superfine fibers. The present inventors attempted to manufacture a battery separator containing 40 mass % of superfine fibers, but this was difficult, because the superfine fibers did not disperse uniformly. When superfine fibers formed from island components remaining after removing sea components from islands-in-sea type composite fibers were used, a short circuit was easily caused, because superfine fibers commonly used had a circular cross-sectional shape, and thus a space between electrodes was easily made small by a pressure applied when a battery was assembled. As described above, a battery separator having a higher electrolyte-holding capacity and capable of more effectively preventing a short circuit is desired.

An object of the present invention is to solve the above problems, that is, to provide a battery separator having a high electrolyte-holding capacity and capable of effectively preventing a short circuit, even if the separator is designed to be thinner to enhance the capacity of a battery, and a battery comprising the battery separator.

The above problems can be solved by the present invention, i.e., a battery separator comprising a nonwoven fabric, wherein the nonwoven fabric contains (1) superfine fibers having a fiber diameter of 3 µm or less,
(2) noncircular fine fibers having a noncircular cross-sectional shape and having a fiber diameter of 3 to 5 µm (excluding 3 µm), the fiber diameter meaning a diameter of a circle having an area the same as that of the noncircular cross-sectional shape, and
(3) polypropylene based high-strength composite fibers containing a fusible component on the surface thereof and having a tensile strength of 4.5 cN/dtex or more, and the fusible components contained in the polypropylene based high-strength composite fibers are fused. The battery separator of the present invention contains the noncircular fine fibers having a fiber diameter of 3 to 5 μm, and thus, a surface area of fibers per a certain volume is not reduced. Further, the battery separator of the present invention contains the noncircular fine fibers having a noncircular cross-sectional shape, and thus, a space between electrodes is not easily made small by a pressure applied when a battery is assembled. Therefore, the battery separator of the present invention has a high electrolyte-holding capacity and is capable of effectively preventing a short circuit.

According to a preferred embodiment of the battery separator of the present invention, the superfine fiber has a circular cross-sectional shape. The battery separator of the present invention has a high electrolyte-holding capacity and is capable of effectively preventing a short circuit, even if the superfine fiber has a circular cross-sectional shape.

According to another embodiment of the battery separator of the present invention, the superfine fibers are formed from one or more island components remaining after removing one or more sea components from islands-in-sea type composite fibers. Each of the superfine fibers has substantially a same fiber diameter, and thus, a battery separator containing pores having a uniform pore size and internal spaces having a uniform size can be prepared. Such a battery separator is capable of uniformly distributing the electrolyte and has an excellent ion permeability.

According to still another embodiment of the battery separator of the present invention, polypropylene noncircular fine fibers, polyethylene noncircular fine fibers, and/or ethylene-vinyl alcohol copolymer noncircular fine fibers are contained as the noncircular fine fibers. The battery separator containing polypropylene noncircular fine fibers or polyethylene noncircular fine fibers exhibits an excellent resistance to an electrolyte. The battery separator containing ethylene-vinyl alcohol copolymer noncircular fine fibers exhibits a high electrolyte-holding capacity, and thus, a battery having a low inner pressure can be assembled.

According to still another embodiment of the battery separator of the present invention, pulp-like fibers in which two or more kinds of the noncircular fine fibers, different with respect to a resin composition bind to each other, are contained. The binding portions in which the noncircular fine fibers bound to each other in the pulp-like fibers can further enhance a maintaining of the space between electrodes against a pressure applied when a battery is assembled. Therefore, the battery separator of the present invention has a high electrolyte-holding capacity and is capable of effectively preventing a short circuit.

According to still another embodiment of the battery separator of the present invention, the nonwoven fabric consists essentially of polyolefin-based fibers. In this case, the battery separator exhibits an excellent resistance to an electrolyte.

According to still another embodiment of the battery separator of the present invention, the separator has a thickness of 0.1 mm or less. When the battery separator is thin, it can be used for the enhancement of the capacity of a battery.

According to still another embodiment of the battery separator of the present invention, the separator has a ratio of maintained thickness of 85% or more. In this case, the battery separator has a high electrolyte-holding capacity and is capable of effectively preventing a short circuit, because a space between electrodes is not easily made small by a pressure applied when a battery is assembled.

According to still another embodiment of the battery separator of the present invention, the superfine fibers account for a 24 mass % or less of the nonwoven fabric. In this case, the battery separator exhibits an excellent air permeability, and thus, an inner pressure is not easily increased when it is applied as a separator for a sealed-type secondary battery.

According to still another embodiment of the battery separator of the present invention, the separator has a mean flow pore size of 5 to 13 μm. In this case, the battery separator exhibits an excellent air permeability, and thus, an inner pressure is not easily increased when it is applied as a separator for a sealed-type secondary battery. Further, a short circuit caused by the movement of electrode active materials in a battery does not easily occur when the battery is used.

According to still another embodiment of the battery separator of the present invention, the separator has a maximum pore size of 25 μm or less. In this case, a penetration into the separator by a flash at the electrode can be avoided, when the separator is wrapped around the electrodes. Further, a short circuit caused by the movement of electrode active materials in a battery does not easily occur when the battery is used.

According to still another embodiment of the battery separator of the present invention, the separator has a capacity for holding a liquid under a pressure of 7% or more. In this case, the battery separator has a high electrolyte-holding capacity, and a smooth electromotive reaction can be performed.

The present invention relates to a battery comprising the above battery separator. The battery of the present invention has a high capacity.

The battery separator of the present invention has a high electrolyte-holding capacity and is capable of effectively preventing a short circuit. The battery of the present invention has a high capacity.

BRIEF DESCRIPTION OF DRAWINGS

FIG. 1 is a cross-sectional view schematically illustrating a dividable composite fiber which may be used for the battery separator of the present invention.

FIG. 2 is a cross-sectional view schematically illustrating another dividable composite fiber which may be used for the battery separator of the present invention.

DETAILED DESCRIPTION OF THE INVENTION

Figure 3:
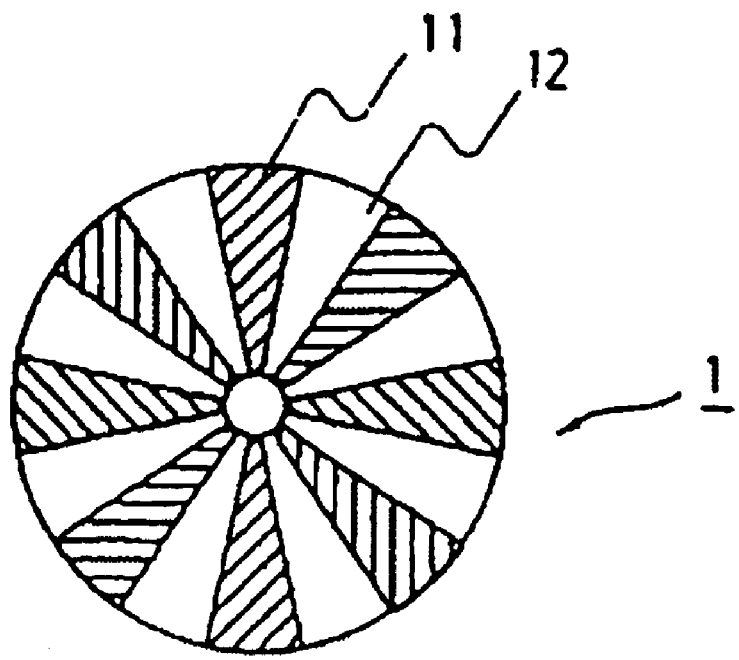
FIG. 3 is a cross-sectional view schematically illustrating still another dividable composite fiber which may be used for the battery separator of the present invention.

Explanations of Reference Signs
  1. Dividable composite fiber
  11. Resin component
  12. Resin component The nonwoven fabric forming the battery separator (hereinafter simply referred to as "separator") of the present invention contains superfine fibers having a fiber diameter of 3 μm or less. The superfine fibers enable a surface area of fibers per a certain volume to be widened and, as a result, an electrolyte-holding capacity can be enhanced, even if the separator is designed to be thinner. Further, the superfine fibers enable the denseness of the separator to be enhanced and, as a result, the separator is capable of effectively preventing a short circuit. The fiber diameter of the superfine fiber is preferably 2 µm or less, because a smaller fiber diameter brings a higher level of the above properties. The lower limit is not particularly limited, but is preferably 0.001 µm or more, more preferably 0.01 µm or more, most preferably 0.1 µm or more. The term "fiber diameter" as used herein means a value obtained by measuring a fiber diameter on an electron micrograph.

The superfine fiber used in the present invention may be preferably a superfine fiber formed from (i.e., consisting of) one or more island components (discontinuous phase material) remaining after removing one or more sea components (continuous phase material) from an islands-in-sea (discontinuous phase in continuous phase) type composite fiber. Each of the superfine fibers has a fiber diameter that does not substantially change in an axial direction of the fiber, namely, has substantially a same fiber diameter, so that the nonwoven fabric containing pores having a uniform pore size and internal spaces having a uniform size can be formed. As a result, the nonwoven fabric is capable of uniformly distributing the electrolyte and has an excellent ion permeability. In particular, superfine fibers formed from island components remaining after removing sea components from islands-in-sea type composite fibers prepared by a composite spinning method is more preferable, because the superfine fibers have nearly identical fiber diameters in plural superfine fibers, and bring a higher level of the above properties. It is generally difficult to obtain superfine fibers having substantially a same fiber diameter that does not substantially change in an axial direction of the fiber, or superfine fibers having nearly identical fiber diameters in plural superfine fibers, by a melt-blowing method.

The island component of the islands-in-sea type composite fiber is the base of the superfine fiber, and is formed from the same resin as that of the superfine fiber. The sea component is removed from the islands-in-sea type composite fiber by a solvent or the like, and is formed from a resin which can be removed more quickly than the island component. For example, when islands-in-sea type composite fibers having island components of a polyolefin based resin in a sea component of polyester or a polyester copolymer are treated with an alkali solution to remove the sea component, superfine fibers consisting of the island component can be obtained.

The cross-sectional shape of the superfine fiber used in the present invention may be a circular shape or a noncircular shape. A circular shape is preferable, because the uniformity of the nonwoven fabric can be improved. In this connection, even if the superfine fiber has a circular cross-sectional shape, the separator of the present invention has a high electrolyte-holding capacity and is capable of effectively preventing a short circuit, because of the presence of the noncircular fine fibers.

When the nonwoven fabric contains bundles of the superfine fibers, the separator is not capable of effectively preventing a short circuit. Therefore, it is preferable to ensure the nonexistence of such bundles and disperse each superfine fiber.

The superfine fibers are preferably drawn, because the separator has an excellent strength, and is not easily broken when a battery is assembled. The term "drawn" as used herein means that fibers are mechanically drawn after forming the fibers. Therefore, fibers formed by a melt-blown method are not drawn. Further, if islands-in-sea type composite fibers are drawn, superfine fibers consisting of the island component generated from the islands-in-sea type composite fibers are drawn.

The superfine fibers are preferably formed from one or more polyolefin based resins, because such fibers exhibit an excellent resistance to an electrolyte. The superfine fibers may be formed from, for example, polyethylene based resins [such as ultra-high-molecular-weight polyethylene, high-density polyethylene, middle-density polyethylene, low-density polyethylene, linear low-density polyethylene, or ethylene copolymers (such as ethylene-vinylalcohol copolymers, ethylene-acrylate copolymers, or ethylene methacrylate copolymers)], polypropylene base resins (such as polypropylene or propylene copolymers), or polymethylpentene based resins (such as polymethylpentene or methylpentene copolymers). Of these resins, polypropylene base resins or polyethylene-based resins are preferable. Further, the superfine fibers may be formed from polyamide-based resins, such as nylon 6, nylon 66, nylon 610, nylon 612, nylon 10, or nylon 12.

It is preferable that the superfine fibers contain one or more resin components capable of participating in fusion (hereinafter sometimes referred to as a fusible component) and are fused by the fusible components, because the superfine fibers may be firmly fixed to avoid a dropping or raising of the fibers. If it is desirable to fuse the superfine fibers, the superfine fibers may be composed of only the fusible component of the above resin, or two or more components, for example, the fusible component and a component (hereinafter sometimes referred to as a non-fusible component) having a melting point higher than that of the fusible component. It is more preferable that the superfine fiber is composed of two or more components, for example, the fusible component and the non-fusible component, because a form or shape of the superfine fiber may be maintained due to the presence of the non-fusible component, and thus, the denseness of the separator is maintained and the separator is capable of effectively preventing a short circuit, when the fusible components are fused. The cross-sectional shape of the superfine fiber is preferably, for example, a sheath-core-type, an eccentric type, or an islands-in-sea type, which exhibits a high adhesive strength. The non-fusible component has a melting point higher than that of the fusible component, preferably by 10° C. or more, more preferably by 20° C. or more, so that the form or shape of the superfine fibers can be maintained by the non-fusible component. The superfine fiber composed of two or more resin components, such as the fusible component and the non-fusible component, may be prepared by a method wherein a nozzle capable of producing the above-mentioned cross-sectional shape (such as a sheath-core type, an eccentric type, or an islands-in-sea type) is used as the nozzle for island components and spun to the islands-in-sea type composite fibers when spinning the islands-in-sea type composite fibers in a conventional composite spinning method, or a method wherein a resin mixture of two or more resin components is supplied to a nozzle for the island component and spun to the islands-in-sea type composite fibers when spinning the islands-in-sea type composite fibers in a conventional composite spinning method, and then the sea component is removed therefrom.

The term "melting point" as used herein means a temperature of a maximum value in a melting-endothermic curve obtained by raising a temperature from room temperature at a rate of 10° C./min, using a differential scanning calorimeter. When there are two or more maximum values, the highest value is the melting point.

The fiber length of the superfine fiber used in the present invention is not particularly limited, but is preferably 0.1 to 25 mm, more preferably 0.1 to 20 mm, because a shorter fiber length brings a higher level of freedom of the fibers, and the fibers may be uniformly dispersed.

The above-mentioned advantageous effects can be easily achieved when the superfine fibers account for a 2 mass % or more (more preferably 5 mass % or more, most preferably 10 mass % or more) in the nonwoven fabric. When the nonwoven fabric contains the superfine fibers in a large amount, the dispersibility of the superfine fibers may become poor, and it may become difficult to effectively prevent a short circuit. Therefore, the superfine fibers account for, preferably a 30 mass % or less, more preferably 25 mass % or less, still more preferably 24 mass % or less, still more preferably 22 mass % or less, most preferably 20 mass % or less.

The nonwoven fabric contained in the separator of the present invention may contain two or more superfine fibers different from each other with respect to a fiber diameter, a fiber length, and/or a resin composition.

The nonwoven fabric forming the separator of the present invention contains noncircular fine fibers having a noncircular cross-sectional shape and having a fiber diameter of 3 to 5 µm (excluding 3 µm) to remove problems caused when the above superfine fibers are used alone. In this case, the shape of the separator can be maintained against a pressure applied when a battery is assembled, and thus, the separator has a high electrolyte-holding capacity and is capable of effectively preventing a short circuit.

The fiber diameter of the noncircular fine fiber is 5 µm or less, preferably 4.5 µm or less, so that a surface area of the fiber per a certain volume is not small. The fiber diameter of the noncircular fine fiber is more than 3 µm, preferably 3.5 µm or more, so that a form or shape of the noncircular fine fiber can be maintained against a pressure. In this connection, the noncircular fine fiber has a noncircular cross-sectional shape, and thus, the fiber diameter of the noncircular fine fiber means a diameter of a circle having an area the same as that of the noncircular cross-sectional shape.

Figure 4:
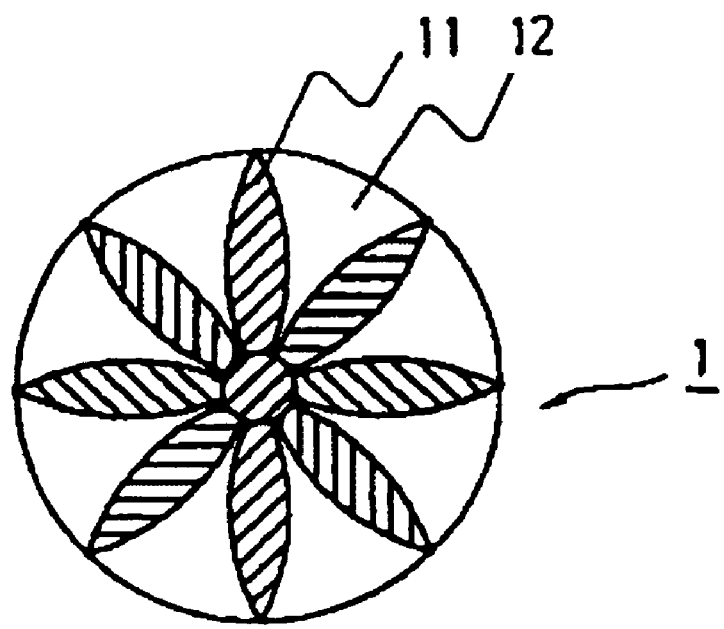
FIG. 4 is a cross-sectional view schematically illustrating still another dividable composite fiber which may be used for the battery separator of the present invention.
Figure 5:
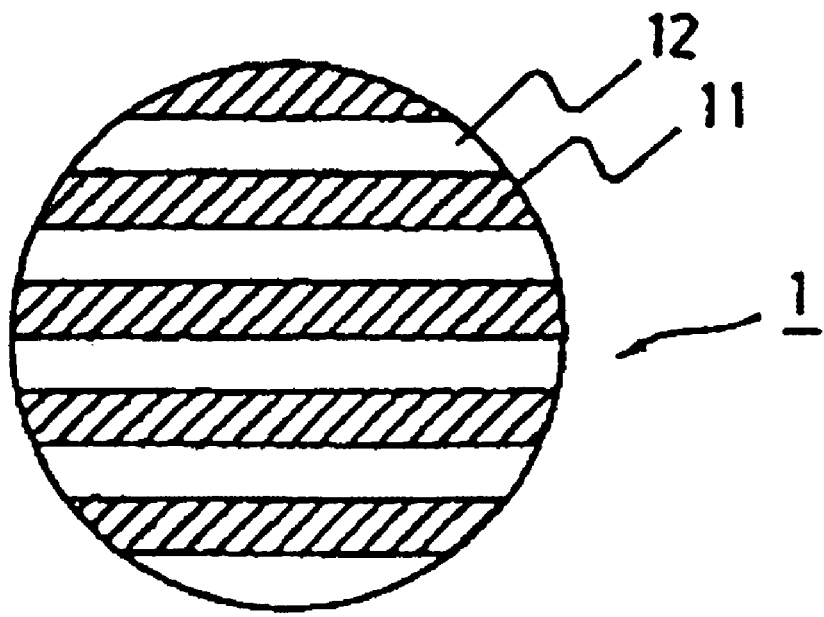
FIG. 5 is a cross-sectional view schematically illustrating still another dividable composite fiber which may be used for the battery separator of the present invention.
Figure 6:
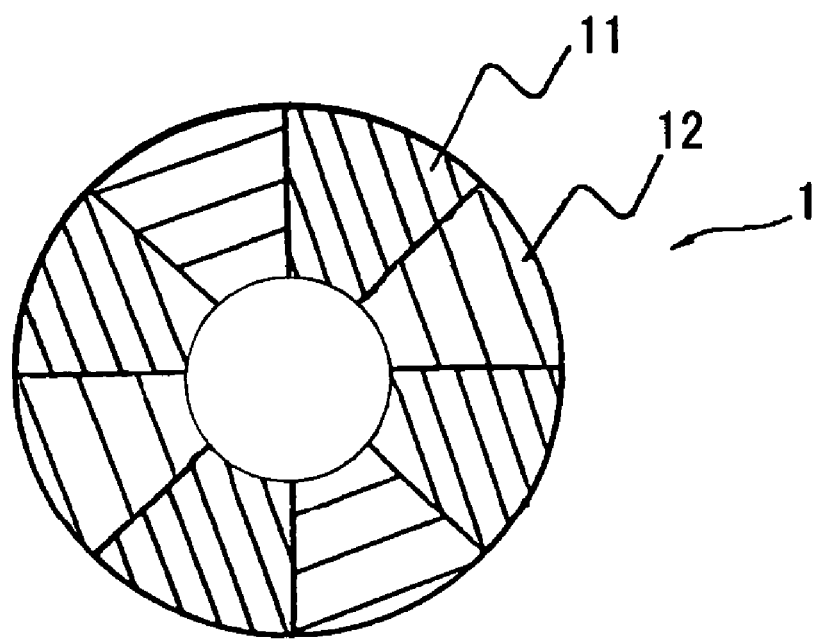
FIG. 6 is a cross-sectional view schematically illustrating still another dividable composite fiber which may be used for the battery separator of the present invention.

To avoid a transformation of the noncircular fine fibers by a pressure applied when a battery is assembled, the cross-sectional shape of the noncircular fine fiber is a noncircle, for example, an oval, an ellipse, a polygon (for example, a triangle, a tetragon such as a trapezoid, a pentagon, or a hexagon). In particular, a triangular cross-sectional shape or a trapezoid cross-sectional shape is preferable. The noncircular fine fibers can be generated by, for example, applying an external force to dividable composite fibers composed of two or more resins different from each other with respect to a resin composition. More particularly, an external force may be applied to dividable composite fibers 1 having a orange-type cross-sectional shape as shown in FIG. 1 to generate noncircular fine fibers of a resin component 11 having a triangular cross-sectional shape, and noncircular fine fibers of a resin component 12 having a triangular cross-sectional shape. An external force may be applied to dividable composite fibers 1 having a orange-type cross-sectional shape as shown in FIG. 2 to generate noncircular fine fibers of a resin component 11 having an elliptic cross-sectional shape, and noncircular fine fibers of a resin component 12 having a triangular cross-sectional shape. An external force may be applied to dividable composite fibers 1 having a orange-type cross-sectional shape as shown in FIG. 3 to generate noncircular fine fibers of a resin component 11 having a triangular cross-sectional shape, noncircular fine fibers of a resin component 12 having a triangular cross-sectional shape, and noncircular fine fibers of a resin component 12 having a circular cross-sectional shape. An external force may be applied to dividable composite fibers 1 having a orange-type cross-sectional shape as shown in FIG. 4 to generate noncircular fine fibers of a resin component 11 having an elliptic cross-sectional shape, noncircular fine fibers of a resin component 12 having a triangular cross-sectional shape, and noncircular fine fibers of a resin component 11 having a circular cross-sectional shape. An external force may be applied to dividable composite fibers 1 having a multiple bimetal-type cross-sectional shape as shown in FIG. 5 to generate noncircular fine fibers of a resin component 11 or a resin component 12 having a trapezoid cross-sectional shape and noncircular fine fibers of a resin component 11 or a resin component 12 having a semicircular cross-sectional shape. An external force may be applied to dividable composite fibers 1 having a orange-type cross-sectional shape and a hollow portion as shown in FIG. 6 to generate noncircular fine fibers of a resin component 11 having a trapezoid cross-sectional shape, and noncircular fine fibers of a resin component 12 having a trapezoid cross-sectional shape. As the external force, there may be mentioned, for example, a fluid jet such as a water jet, a calender, a refiner, a pulper, a mixer, or a beater. Further, a nozzle capable of spinning fibers having a noncircular cross-sectional shape may be used to obtain the noncircular fine fibers.

The noncircular fine fibers are preferably formed from one or more polyolefin based resins which are the same as those of the superfine fibers. That is, the noncircular fine fibers may be formed from, for example, polyethylene based resins [such as ultra-high-molecular-weight polyethylene, high-density polyethylene, middle-density polyethylene, low-density polyethylene, linear low-density polyethylene, or ethylene copolymers (such as ethylene-vinylalcohol copolymers, ethylene-acrylate copolymers, or ethylene methacrylate copolymers)], polypropylene base resins (such as polypropylene or propylene copolymers), or polymethylpentene based resins (such as polymethylpentene or methylpentene copolymers). In particular, the nonwoven fabric containing polypropylene noncircular fine fibers or polyethylene noncircular fine fibers exhibits an excellent resistance to an electrolyte. The nonwoven fabric containing ethylene-vinylalcohol copolymer noncircular fine fibers exhibits a high electrolyte-holding capacity, and thus, a battery having a low inner pressure can be assembled. The nonwoven fabric may contain, as the noncircular fine fibers, two or more noncircular fine fibers different from each other with respect to at least one of a resin composition, a fiber diameter, and a fiber length. Further, the noncircular fine fibers may be formed from polyamide-based resins, such as nylon 6, nylon 66, nylon 610, nylon 612, nylon 10, or nylon 12.

The noncircular fine fibers are preferably drawn, because the separator has an excellent strength, and is not easily broken when a battery is assembled. In this connection, the noncircular fine fibers generated from drawn dividable composite fibers are drawn.

The fiber length of the noncircular fine fiber used in the present invention is not particularly limited, but is preferably 0.1 to 25 mm, more preferably 0.1 to 20 mm, because a shorter fiber length brings a higher level of freedom of the fibers, and the fibers may be uniformly dispersed.

The above-mentioned advantageous effects can be easily achieved when the noncircular fine fibers account for a 5 mass % or more (more preferably 10 mass % or more, most preferably 15 mass % or more) in the nonwoven fabric. The noncircular fine fibers account for, preferably an 88 mass % or less, more preferably 75 mass % or less, still more preferably 60 mass % or less, most preferably 50 mass % or less, so that the strength of the nonwoven fabric can be enhanced by the polypropylene based high-strength composite fibers.

The nonwoven fabric contained in the separator of the present invention contains the polypropylene based high-strength composite fibers containing one or more fusible components on the surface thereof and having a tensile strength of 4.5 cN/dtex or more, as well as the superfine fibers and the noncircular fine fibers, and the fusible components contained in the polypropylene based high-strength composite fibers are fused. Therefore, even if the separator is designed to be thinner, a short circuit caused by a tear in the separator by an edge of an electrode or a penetration into the separator by a flash at the electrode, when the separator is wrapped around the electrodes, will be avoided.

Because a higher tensile strength of the polypropylene based high-strength composite fibers brings a higher level of the above-mentioned advantageous effects, the tensile strength is preferably 5.0 cN/dtex or more, more preferably 5.5 cN/dtex or more, still more preferably 6.0 cN/dtex or more, most preferably 6.2 cN/dtex or more. The upper limit of the tensile strength is not particularly limited, but approximately 50 cN/dtex is suitable. The term "tensile strength" as used herein means a value determined by a tester of a constant rate of strain type (clamping distance=20 mm; pulling rate=20 mm/min.) in accordance with JIS (Japanese Industrial Standard) L 1015:1999, 8.7.1 (Test under standard condition).

The polypropylene based high-strength composite fibers used in the present invention contain one or more fusible components on the surface thereof, as well as the polypropylene based component(s). Therefore, the nonwoven fabric in which the polypropylene based high-strength composite fibers are fused with each other can be formed and, as a result, is capable of effectively preventing a short circuit.

The polypropylene based component may be a homopolymer of propylene or a copolymer of propylene and $\alpha$-olefin (such as ethylene or butene-1). More particularly, there may be mentioned, for example, a crystalline isotactic propylene homopolymer, an ethylene-propylene random copolymer containing ethylene units in a small amount, a propylene block copolymer composed of homogeneous portions of a propylene homopolymer and copolymeric portions of an ethylene-propylene random copolymer containing ethylene units in a relatively large amount, or a crystalline propylene-ethylene-$\alpha$-olefin copolymer in which the homogeneous portion or copolymeric portion in the propylene block copolymer is a copolymeric portion further containing $\alpha$-olefin such as butene-1. Of these polymers, an isotactic polypropylene homopolymer, which has an excellent strength, is preferable, and in particular, an isotactic polypropylene homopolymer having an isotactic pentad fraction (IPF) of 90% or more, a Q value (weight average molecular weight/number average molecular weight=Mw/Mn ratio; an index of molecular weight distribution) of 6 or less, and a melt index (MI; temperature=230° C., load=2.16 kg) of 3 to 50 g/10 min is more preferable. Such polypropylene based components may be obtained by polymerizing propylene alone or copolymerizing propylene and other $\alpha$-olefin(s) in the presence of a Ziegler-Natta catalyst or a metallocene catalyst.

The fusible component has a melting point lower than that of the polypropylene based component, preferably by 10° C. or more, more preferably by 20° C. or more, so that it does not affect the polypropylene based component and the form or shape of fibers can be maintained by the polypropylene based component when fibers are fused. As the fusible component, there may be mentioned, for example, ethylene based polymers (such as high-density polyethylene, middle-density polyethylene, low-density polyethylene, or linear low-density polyethylene) or copolymers of propylene and other $\alpha$-olefin(s). Of these polymers, ethylene based polymers are preferable, particularly high-density polyethylene is more preferable, because a separator having a sufficient strength and a good workability can be prepared.

In the polypropylene based high-strength composite fiber containing the fusible component on the surface thereof, the fiber surface may be covered with the fusible component, preferably by 50% or more of the fiber surface (except for the both ends), more preferably by 70% or more thereof, still more preferably by 90% or more thereof, most preferably by 100% thereof. This is because the mechanical strength of the separator may be enhanced when the fiber surface is more widely covered with the fusible component. Therefore, as the cross-sectional shape of the polypropylene based high-strength composite fiber, a sheath-core type, an eccentric type, or an islands-in-sea type is preferable.

A Young's modulus of the polypropylene based high-strength composite fiber is preferably 30 cN/dtex or more, more preferably 35 cN/dtex or more, most preferably 40 cN/dtex or more, so that the separator does not easily change shape and has a high electrolyte-holding capacity. The upper limit of the Young's modulus is not particularly limited, but is preferably 110 cN/dtex or less. The term "Young's modulus" as used herein means an apparent Young's modulus calculated from an initial tensile strength determined in accordance with a method defined in JIS L 1015:1999, 8.11. The initial tensile strength is determined by a tester of a constant rate of strain type.

A rate of heat shrinkage of the polypropylene based high-strength composite fiber is preferably 10% or less, more preferably 9% or less, because when a nonwoven fabric is prepared by fusing the fusing component of the polypropylene based high-strength composite fibers, the nonwoven fabric is not easily contracted (i.e., uniform dispersibility of the fibers is maintained) and, as a result, is capable of effectively preventing a short circuit. The term "rate of heat shrinkage" as used herein means a value measured after heating the fiber in an oven dryer at 120° C. for 30 minutes in accordance with JIS L 1013 [Rate of heat shrinkage (method B)].

The fiber diameter of the polypropylene based high-strength composite fiber is not particularly limited, but is preferably 5 to 32 μm, more preferably 8 to 17 μm. When the fiber diameter of the polypropylene based high-strength composite fiber is less than 5 μm, a short circuit caused by a tear in the separator by an edge of an electrode or a penetration into the separator by a flash generated at the electrode easily occurs. When the fiber diameter of the polypropylene based high-strength composite fiber is more than 32 μm, the polypropylene based high-strength composite fibers are not uniformly dispersed and the denseness of the separator is easily lost.

The fiber length of the polypropylene based high-strength composite fiber is not particularly limited, but is preferably 0.1 to 25 mm, more preferably 0.1 to 20 mm, because a shorter fiber length brings a higher level of freedom of the fibers, the fibers may be uniformly dispersed, and the uniformity of the nonwoven fabric can be improved. The polypropylene based high-strength composite fibers are preferably cut in a length of 0.1 to 25 mm, more preferably 0.1 to 20 mm.

The polypropylene based high-strength composite fibers used in the present invention may be prepared by, for example, a method disclosed in Japanese Unexamined Patent Publication (Kokai) No. 2002-180330. More particularly, undrawn polypropylene based composite fibers containing fusible components on the surface thereof are spun by a conventional melt spinning method, and the undrawn fibers are drawn in saturated steam under pressure at a temperature of more than 100° C. and less than the melting point of the fusible component by a factor of 4 to 15.

The nonwoven fabric forming the separator of the present invention may contain two or more kinds of polypropylene based high-strength composite fibers different from each other with respect to a fiber diameter or a fiber length.

The above-mentioned advantageous effects can be easily achieved when the polypropylene based high-strength composite fibers account for a 10 mass % or more (more preferably 20 mass % or more, still more preferably 30 mass % or more, most preferably 40 mass % or more) in the nonwoven fabric. The polypropylene based high-strength composite fibers account for, preferably a 93 mass % or less, more preferably 85 mass % or less, most preferably 70 mass % or less, in view of the contents of the superfine fibers and the noncircular fine fibers.

The nonwoven fabric contained in the separator of the present invention contains the above-mentioned superfine fibers, noncircular fine fibers, and polypropylene based high-strength composite fibers, and can further contain other fibers such as fibers having a circular cross-sectional shape and having a fiber diameter of more than 3 μm, fibers having a fiber diameter of more than 5 μm, fibers consisting of a single resin component and having a tensile strength of 4.5 cN/dtex or more, fibers containing a fusible component on the surface thereof and having a tensile strength of less than 4.5 cN/dtex, and/or pulp-like fibers in which two or more kinds of the noncircular fine fibers different with respect to a resin composition bind to each other. The pulp-like fibers are bound to at least two or more of the noncircular fine fibers and the noncircular fine fibers are of different resin compositions. Because the pulp-like fibers are not easily compressed because of the presence of the binding portions in which the noncircular fine fibers bind to each other, a space between electrodes is not easily made small by a pressure applied when a battery is assembled, and thus the separator is capable of effectively preventing a short circuit. Further, the separator containing the pulp-like fibers has a high electrolyte-holding capacity, because of fibrils of noncircular fine fibers. The pulp-like fibers may be obtained by, for example, applying an external force to the above-mentioned dividable composite fibers, which are composed of two or more resins different from each other with respect to a resin composition and are capable of generating the noncircular fine fibers, and not fully dividing the fibers. In this case, the divided portions of the dividable composite fibers can form the fibrils of the noncircular fine fibers, and the nondivided portions thereof can form the binding portions of the noncircular fine fibers.

The nonwoven fabric contained in the separator of the present invention is formed from the above-mentioned fibers. It is preferable that the nonwoven fabric consists essentially of polyolefin based fibers, because such fibers exhibit an excellent resistance to an electrolyte, and do not generate ammonia that is believed to be a cause of self-discharging. The term "polyolefin-based fibers" as used herein includes a fiber that is composed of only polyolefin based resin as a whole, and a fiber that is composed of polyolefin based resin on at least the whole surface thereof (except for both ends of the fiber). This is because a part having an influence on the resistance to an electrolyte is the surface of the fiber. For example, a composite fiber composed of a polyamide resin and a polyolefin based resin, and having the whole surface consisting of the polyolefin-based resin (except for both ends) is included in the above polyolefin-based fiber. Therefore, the term "(nonwoven fabric) consisting essentially of polyolefin based fibers" means that the nonwoven fabric consists of the above-mentioned polyolefin based fibers alone.

If the separator is composed essentially of the polyolefin-based resin, the electrolyte-holding capacity is liable to be lowered. Therefore, it is preferable to introduce one or more oxygen- and/or sulfur-containing functional groups such as sulfonic acid group, sulfate group, sulfofluoride group, hydroxyl group, carboxyl group, or carbonyl group, onto the surfaces of the materials (such as fibers) constituting the separator; to graft-polymerize one or more hydrophilic monomers on the surfaces of the materials; to apply one or more surface-active agents to the surfaces of the materials; or to apply one or more hydrophilic resin to the surfaces of the materials.

The separator of the present invention can be thinned, because the separator contains the nonwoven fabric comprising the above-mentioned superfine fibers and noncircular fine fibers. The thickness of the separator may be 0.1 mm or less, preferably 0.095 mm or less. The mass per unit area of the separator may be 50 g/m$^2$ or less, preferably 48 g/m$^2$ or less. The term "thickness" as used herein means an average of 10 thicknesses randomly selected and determined in accordance with a method defined in JIS C2111 5.1(1), using an outside micrometer (0 to 25 mm) described in JIS B 7502:1994. The term "mass per unit area" as used herein means a basis weight determined in accordance with a method defined in JIS P 8124 (Paper and paperboard; a method for measuring basis weight).

The separator of the present invention contains the noncircular fine fibers and the polypropylene based high-strength composite fibers. Therefore, a space between electrodes is not easily made small by a pressure applied when a battery is assembled and, as a result, the battery separator has a high electrolyte-holding capacity and is capable of effectively preventing a short circuit. More particular, the "ratio of maintained thickness" as defined below may be 85% or more (preferably 88% or more), and rarely will a pressure applied crush the separator. The term "rigid matrix" refers to a matrix whose ratio of maintained thickness is 85% or more.

A thickness of the separators at a load of 200 g ($T_{200}$) is measured by a micrometer (diameter of a spindle=6.35 mm). Then, a thickness of the separators at a load of 1000 g ($T_{1000}$) is measured by the micrometer. The percentage of the thickness at a load of 1000 g ($T_{1000}$) to the thickness at a load of 200 g ($T_{200}$) is regarded as the ratio of maintained thickness (Tr).

$$Tr=(T_{1000}/T_{200})\times 100$$

In the present invention, the mean flow pore size of the separator is preferably 5 to 13 μm, more preferably 5 to 11 μm. If the mean flow pore size is less than 5 μm, the battery separator exhibits a poor air permeability, and thus, an inner pressure is liable to be increased when it is applied as a separator for a sealed-type secondary battery. If the mean flow pore size is more than 13 μm, a short circuit caused by the movement of electrode active materials in a battery is liable to occur when the battery is used.

The maximum pore size of the separator is preferably 25 μm or less. If the maximum pore size of the separator is more than 25 μm, a short circuit caused by a penetration into the separator by a flash at the electrode is liable to occur when the separator is wrapped around the electrodes, or a short circuit caused by the movement of electrode active materials in a battery is liable to occur when the battery is used. The maximum pore size of the separator is more preferably 20 μm or less, most preferably 18 μm or less. In this connection, the maximum pore size is equal to or more than the mean flow pore size. Such a maximum pore size cannot be obtained when fibers are simply entangled with a fluid jet (particularly a water jet).

The capacity for holding a liquid under pressure of the separator is preferably 7% or more. If the capacity for holding a liquid under pressure is less than 7%, a smooth electromotive reaction cannot be carried out due to a lack of an electrolyte, and thus, a lifetime of the battery is liable to be shortened.

It is preferable that the separator of the present invention is composed of one or more nonwoven fabrics having the same fiber combination, because an electrolyte can be evenly held throughout the separator, and therefore, a battery having a low inner pressure and a high capacity can be assembled. The separator of the present invention may contain other porous materials such as a microporous film.

The separator of the present invention can be used, for example, as a separator of a primary battery (such as an alkaline-manganese battery, a mercury battery, a silver oxide battery, a lithium battery, or an air battery), or a secondary battery (such as a nickel-cadmium battery, silver-zinc battery, silver-cadmium battery, nickel-zinc battery, nickel-hydrogen battery, lead storage battery, or a lithium ion battery), particularly a separator of a nickel-cadmium battery or a nickel-hydrogen battery.

The nonwoven fabric forming the separator of the present invention may be manufactured by, for example, the following procedures. First, at least superfine fibers, dividable composite fibers composed of two or more resins different from each other with respect to a resin composition, and polypropylene based high-strength composite fibers are prepared. As previously mentioned, it is preferable that these fibers are formed from polyolefin-based resins.

Thereafter, a fiber web is formed from the fibers. The method for preparing the fiber web is not particularly limited, but the fiber web may be prepared by a dry-laid method, such as a carding method or an air-laid method, or a wet-laid method. Of these methods, the wet-laid method is preferable, because the nonwoven fabric having a property of a uniform dispersal of fibers and an ease of uniformly holding an electrolyte may be easily prepared. As the wet-laid method, there may be mentioned conventional methods, such as a flat long-wire type, an inclined short-wire type, a cylindrical type, or a long-wire/cylindrical type.

Then, the fiber web is treated with a fluid jet (particularly a water jet) to generate noncircular fine fibers by dividing the dividable composite fibers in whole or in part. In this connection, the superfine fibers, noncircular fine fibers, and polypropylene based high-strength composite fibers are entangled by the action of the fluid jet to enhance a mechanical strength of the nonwoven fabric. When the noncircular fine fibers are generated by the fluid jet, there are portions the fluid jet does not substantially affect (for example, portions between nozzles, or the insides of the fiber web), and thus, the pulp-like fibers in which the noncircular fine fibers bind to each other are easily formed. In this connection, it is preferable that the dividable composite fibers are formed from polyolefin-based resins. When the dividable composite fibers are composed of polyolefin based resins (particularly polypropylene and polyethylene), the dividable composite fibers are not easily divided, and thus the noncircular fine fibers are not easily generated, it is preferable that a treatment with a fluid jet is carried out after the fusing component of the polypropylene based high-strength composite fibers (and a resin component having the lowest melting point in the dividable composite fibers, if necessary) is fused. When a fluid jet is applied after the fusing treatment, the nonwoven fabric having a maximum pore size of 25 μm or less, or the separator having a maximum pore size of 25 μm or less, can be easily prepared, even if the fluid jet is applied.

The conditions of the fluid jet are not particularly limited, so long as the noncircular fine fibers can be generated by dividing the dividable composite fibers in whole or in part. The conditions can be appropriately determined by repeated experiments. In general, a fluid jet under a pressure of 1 to 30 MPa may be ejected onto a fiber web from a nozzle plate containing one or more lines of nozzles having a diameter of 0.05 to 0.3 mm and a pitch of 0.2 to 3 mm to generate the noncircular fine fibers. The fluid jet may be applied to one side or both sides of the fiber web, once or more times. If a supporter, such as a net, to carry a fiber web thereon when treated with the fluid jet contains thick supporting portions (non-opening portions), the resulting nonwoven fabric contains pores having a large diameter (i.e., the maximum pore size becomes large), and a short circuit is liable to occur. Therefore, it is preferable to use a supporter, which contains supporting portions having a thickness of 0.25 mm or less.

The fiber web in which the noncircular fine fibers are generated may be heated to fuse the fusible component in the polypropylene based high-strength composite fibers and prepare a nonwoven fabric. The heating temperature is not particularly limited, so long as the fusing component may be fused. The heating treatment is carried out, preferably by blowing heated air within the range of from a temperature which is 5° C. lower than a melting point of the fusible component to a temperature which is 20° C. higher than a melting point of the fusible component without pressure for 3 to 20 seconds, more preferably by blowing heated air within the range of from a temperature which is 3° C. higher than a melting point of the fusible component to a temperature which is 20° C. higher than a melting point of the fusible component without pressure for 3 to 20 seconds while ensuring a close contact between the fiber web and the supporter (such as a conveyor) under suction from below. In this case, a nonwoven fabric having an excellent mechanical strength and having high porosity conducive to a high electrolyte-holding capacity can be prepared. In this connection, the fusing treatment of the fusible component in the polypropylene based high-strength composite fibers may be carried out under pressure, or by fusing the fusible component without pressure and thereafter applying a pressure thereto.

It is preferable that the nonwoven fabric prepared as described above is composed essentially of the polyolefin-based fibers, to enhance a resistance to an electrolyte. Therefore, it is preferable to carry out a treatment for imparting a hydrophilic property, to enhance the electrolyte-holding capacity. The treatment for imparting a hydrophilic property may be, for example, a sulfonating treatment, a treatment with fluorine gas, a graft polymerization treatment with vinyl monomers, a treatment with a surface-active agent, a discharging treatment, or a treatment to adhere hydrophilic resins.

The sulfonating treatment contains, for example, but is not limited to, a method for introducing sulfonic acid groups into the nonwoven fabric by dipping the nonwoven fabric in a solution of fuming sulfuric acid, sulfuric acid, sulfur trioxide, chlorosulfuric acid, or sulfuryl chloride, or a method for introducing sulfonic acid groups into the nonwoven fabric by subjecting the nonwoven fabric to a discharging treatment in the presence of sulfur monoxide gas, sulfur dioxide gas, sulfur trioxide gas or the like.

The treatment with fluorine gas is not limited. For example, a hydrophilic property can be imparted to the fiber surfaces of the nonwoven fabric by exposing the nonwoven fabric to a gas mixture of fluorine gas diluted with an inactive gas (such as nitrogen or argon) and at least one gas selected from a group consisting of oxygen, carbon dioxide and sulfur dioxide gases and introducing sulfofluoride groups or the like into the fiber surfaces. A permanent hydrophilic property can be more effectively imparted by adhering sulfur dioxide gas to the nonwoven fabric, and then bringing the nonwoven fabric into contact with fluorine gas.

Examples of the vinyl monomer which may be used in the graft polymerization with vinyl monomers are acrylic acid, methacrylic acid, acrylate, methacrylate, vinyl pyridine, vinyl pyrrolidone, or styrene. When styrene is graft polymerized, it is preferable to carry out a sulfonation, to impart an affinity with an electrolyte. Of these monomers, acrylic acid has a good affinity with an electrolyte and may be preferably used. A method for polymerizing the vinyl monomers is, for example, a method for dipping the nonwoven fabric in a solution containing the vinyl monomers and an initiator, and heating; a method for coating the nonwoven fabric with vinyl monomers and applying radiation; a method for applying radiation to the nonwoven fabric and then bringing the nonwoven fabric into contact with the vinyl monomers; a method for impregnating the nonwoven fabric with a solution containing vinyl monomers and a sensitizing agent, and applying ultraviolet rays. The graft polymerization can be effectively carried out by modifying the surface of fibers with ultraviolet radiation, a corona discharge, or a plasma discharge before bringing the nonwoven fabric into contact with the vinyl monomer solution, to enhance the affinity thereof with the vinyl monomer solution.

The treatment with a surface-active agent may be carried out, for example, by coating or spraying a solution of an anionic surface-active agent (such as an alkali metal salt of a higher fatty acid, alkyl sulfonate, or a salt of sulfosuccinate) or a nonionic surface-active agent (such as polyoxyethylene alkyl ether, or polyoxyethylene alkylphenol ether) to the nonwoven fabric, or dipping the nonwoven fabric in the solution.

As the discharging treatment, there may be mentioned, for example, treatments with a corona discharge, plasma, glow discharge, surface discharge, ultraviolet rays, or electron rays. Of the discharging treatments, a method comprising the steps of placing the nonwoven fabric between a pair of electrodes carrying a dielectric layer respectively in air under an atmospheric pressure, so that the nonwoven fabric is brought into contact with both dielectric layers, and then applying an alternating current voltage between the electrodes to thereby induce an electric discharge in internal voids contained in the nonwoven fabric, can be preferably conducted. This is because not only the outer surfaces but also the insides of the nonwoven fabric can be thus treated; and therefore, the resulting nonwoven fabric is used as the separator of a battery, the insides of the nonwoven fabric exhibit an excellent electrolyte-holding capacity.

The treatment to apply hydrophilic resins can be carried out by adhering hydrophilic resins, such as carboxymethyl cellulose, polyvinyl alcohol, polyvinyl alcohol which is cross-linkable, or polyacrylic acid, to the nonwoven fabric. The hydrophilic resins may be adhered to the nonwoven fabric by coating or spraying the nonwoven fabric with a solution prepared by dissolving or dispersing the hydrophilic resins in an appropriate solvent, or dipping the nonwoven fabric in the solution, and then drying. The amount of the hydrophilic resins adhered is preferably 0.3 to 5 mass % with respect to an amount of the nonwoven fabric, so as not to affect the air permeability. The cross-linkable polyvinyl alcohol is, for example, polyvinyl alcohol substituted by a photosensitive group at a part of hydroxyl groups, particularly polyvinyl alcohol having styryl pyridinium, styryl quinolinium, or styryl benzthiazolinium groups as the photosensitive group. The cross-linking of the cross-linkable polyvinyl alcohols can be carried out by adhering the cross-linkable polyvinyl alcohols to the nonwoven fabric as in the case of other hydrophilic resins and irradiating the cross-linkable polyvinyl alcohols with light. The polyvinyl alcohol substituted by a photosensitive group at a part of hydroxyl groups has an excellent resistance to alkalis and contains many hydroxyl groups enabling a formation of chelates with ions, and thus can form chelates with ions before the ions are deposited on electrodes in the form of branches, during charging and/or discharging, to thereby effectively prevent a short circuit between the electrodes.

The nonwoven fabric forming the separator of the present invention may be manufactured as described above, but the process thereof is not limited to the above procedures. More particularly, at least superfine fibers, noncircular fine fibers, and polypropylene based high-strength composite fibers are prepared, a fiber web are formed as described above, and the fusible component of the polypropylene based high-strength composite fibers are fused with each other without the treatment with a fluid jet, to obtain a nonwoven fabric. In this case, it is preferable to carry out the treatment for imparting a hydrophilic property. In this connection, the noncircular fine fibers may be formed by, for example, applying an external force, such as a refiner, a pulper, a mixer, or a beater, to dividable composite fibers composed of two or more resins different from each other with respect to a resin composition. In this case, the pulp-like fibers may be formed by not fully applying the external force. When the fiber web is formed by using the noncircular fine fibers, the uniformity of the fiber web does not easily become poor by the entangling treatment with a fluid jet, and thus, the nonwoven fabric having an excellent denseness and capable of effectively preventing a short circuit can be prepared, and the process is preferable. That is, the nonwoven fabric having a small mean flow pore size and a small maximum pore size, or the separator having a small mean flow pore size and a small maximum pore size can be easily prepared by the process using the noncircular fine fibers.

The nonwoven fabric having a capacity for holding a liquid under a pressure of 7% or more may be easily prepared by appropriately adjusting conditions, for example, the amounts of the superfine fibers and the noncircular fine fibers, a selection of a wet-laid method, or the treatment for imparting a hydrophilic property. In addition, the separator containing porous materials other than the nonwoven fabric may be prepared by unifying the porous materials with the nonwoven fabric, before heating the fiber web, or before or after the treatment for imparting a hydrophilic property.

The battery of the present invention may have the same constitution as that of a conventional battery, except that it contains the separator of the present invention.

For example, a cylindrical nickel-hydrogen battery has a structure in which a nickel positive electrode and a hydrogen-occluded alloy negative electrode, which are separated by the above separator and rolled into a voluted form, are put into a metal case. As the nickel positive electrode, for example, a spongy nickel porous material filled with active materials consisting of a nickel hydroxide solid solution powder may be used. As the hydrogen-occluded alloy negative electrode, for example, a nickel-plated pierced steel plank, spongy nickel, or a nickel net filled with $AB_5$ based (rare-earth based) alloy, $AB/A_2B$ based (Ti/Zr based) alloy, or $AB_2$ (Laves phase) based alloy may be used. As an electrolyte, for example, a two-component system such as potassium hydroxide/lithium hydroxide, or a three-component system such as potassium hydroxide/sodium hydroxide/lithium hydroxide may be used. The case is sealed with a sealing plate having a safety valve, via an insulating gasket. The battery has a positive collector and a insulating plate, and may have a negative collector if necessary.

The battery of the present invention is not limited to a cylindrical battery, but may be, for example, a prismatic battery or a button battery. The prismatic battery has a laminate structure in which the separator is sandwiched between the positive electrode and the negative electrode. The battery of the present invention may be a closed battery or an open battery.

EXAMPLES

The present invention will now be further illustrated by, but is by no means limited to, the following Examples.

Example 1

Fibers having 61 island components of polypropylene in a sea component of polyethylene terephthalate were spun by a composite spinning method, and cut to obtain islands-in-sea type composite fibers (fineness=1.65 dtex, fiber length=2 mm). The islands-in-sea type composite fibers were dipped in a bath (temperature=80° C.) of a 10 mass % aqueous solution of sodium hydroxide for 60 minutes, and the sea component in the islands-in-sea type composite fibers was removed to obtain polypropylene superfine fibers (fiber diameter=2 µm, melting point=172° C., fiber length=2 mm, not fibrillated, drawn, cross-sectional shape=circle). Each superfine fiber had substantially a same diameter in an axial direction thereof, and the superfine fibers had nearly identical fiber diameters in plural superfine fibers.

Dividable composite fibers 1 (fineness=3.3 dtex, fiber length=6 mm) having an orange-type cross-sectional shape as shown in FIG. 1 and composed of a polypropylene component and an ethylene-vinyl alcohol copolymer component were prepared. The dividable composite fiber (drawn) was able to generate 8 polypropylene noncircular fine fibers (cross-sectional shape=triangle, fiber diameter=5 µm) and 8 ethylene-vinyl alcohol copolymeric noncircular fine fibers (cross-sectional shape=triangle, fiber diameter=5 µm). The dividable composite fibers 1 were dispersed in water and divided by a pulper to form a slurry mixture of the polypropylene noncircular fine fibers, the ethylene-vinyl alcohol copolymeric noncircular fine fibers, and pulp-like fibers in which the polypropylene noncircular fine fibers and the ethylene-vinyl alcohol copolymeric noncircular fine fibers were bound to each other.

Further, polypropylene based high-strength composite fibers (fiber diameter=10 µm, fiber length=5 mm, Young's modulus=45 cN/dtex, rate of heat shrinkage=7%, tensile strength=6.5 cN/dtex) having a core component of polypropylene (melting point=168° C.) and a sheath component of high density polyethylene (melting point=135° C.) was prepared.

A slurry was prepared by mixing and dispersing a 20 mass % of the polypropylene superfine fibers, 15 mass % (as fibers) of the slurry mixture, and 65 mass % of the polypropylene based high-strength composite fibers, and a wet-laid fiber web in which all fibers were uniformly dispersed was formed from the slurry by a wet-laid method.

The resulting wet-laid fiber web was treated by passing heated air therethrough at 145° C. without pressure for 10 seconds, while ensuring a close contact between the fiber web and the conveyor under suction from below, to fuse only high density polyethylene as the sheath component of the polypropylene based high-strength composite fibers, and obtain a fused nonwoven fabric.

The fused nonwoven fabric was calendered under a linear pressure of 9.8 N/cm, and treated with fluorine gas, using a gas mixture of fluorine, oxygen, and sulfur dioxide gases, to obtain a separator (surface density=40 g/m$^2$; thickness=0.1 mm).

Example 2

The superfine fibers, the dividable composite fibers, and the polypropylene based high-strength composite fibers were prepared as in Example 1.

A slurry was prepared by mixing and dispersing a 20 mass % of the polypropylene superfine fibers, 15 mass % of the dividable composite fibers, and 65 mass % of the polypropylene based high-strength composite fibers, and a wet-laid fiber web in which all fibers were uniformly dispersed was formed from the slurry by a wet-laid method.

The resulting wet-laid fiber web was heat-treated at 145° C. to fuse only high density polyethylene of the polypropylene based high-strength composite fibers, and obtain a fused fiber web.

The fused fiber web was mounted on a net (linear wire diameter=0.15 mm), and then the dividable composite fibers were divided with a water jet from a nozzle plate (nozzle diameter=0.13 mm, pitch=0.6 mm, pressure=12.7 MPa) to form a divided fused fiber web. In this case, each side of the fiber web was treated with the water jet in turn, and the treatment was repeated twice.

The resulting divided fused fiber web was treated by passing heated air therethrough at 145° C. without pressure for 10 seconds, while ensuring a close contact between the fiber web and the conveyor under suction from below, to fuse only high density polyethylene as the sheath component of the polypropylene based high-strength composite fibers, and obtain a fused nonwoven fabric.

The fused nonwoven fabric was calendered under a linear pressure of 9.8 N/cm, and treated with fluorine gas, using a gas mixture of fluorine, oxygen, and sulfur dioxide gases, to obtain a separator (surface density=40 g/m$^2$; thickness=0.1 mm). The separator contained the polypropylene superfine fibers and the polypropylene based high-strength composite fibers, and further contained fibers generated from the dividable composite fibers, i.e., the polypropylene noncircular fine fibers, the ethylene-vinyl alcohol copolymeric noncircular fine fibers, and pulp-like fibers in which the polypropylene noncircular fine fibers and the ethylene-vinyl alcohol copolymeric noncircular fine fibers were bound to each other.

Comparative Example 1

The fusing treatment, the calendaring treatment, and the treatment with fluorine gas described in Example 1 were carried out, except that a slurry was prepared by mixing and dispersing a 30 mass % of the polypropylene superfine fibers and 70 mass % of the polypropylene based high-strength composite fibers, and a wet-laid fiber web in which all fibers were uniformly dispersed was formed from the slurry by a wet-laid method, to obtain a separator (surface density=40 g/m$^2$; thickness=0.1 mm).

Comparative Example 2

The fusing treatment, the calendaring treatment, and the treatment with fluorine gas described in Example 1 were carried out, except that a slurry was prepared by mixing and dispersing a 50 mass % (as fibers) of the slurry mixture and 50 mass % of the polypropylene based high-strength composite fibers, and a wet-laid fiber web in which all fibers were uniformly dispersed was formed from the slurry by a wet-laid method, to obtain a separator (surface density=40 g/m$^2$; thickness=0.1 mm).

Example 3

The polypropylene superfine fibers described in Example 1, and dividable composite fibers (drawn, fineness=1.7 dtex, fiber length=5 mm) having an orange-type cross-sectional shape and a hollow portion as shown in FIG. 6 and composed of a polypropylene component and a high density polyethylene component were prepared. The dividable composite fiber was able to generate 8 polypropylene noncircular fine fibers (cross-sectional shape=approximate trapezoid, fiber diameter=3.9 μm) and 8 high density polyethylene noncircular fine fibers (cross-sectional shape=approximate trapezoid, fiber diameter=3.8 μm). The dividable composite fibers were dispersed in water and divided by a pulper to form a slurry mixture of the polypropylene noncircular fine fibers, the high density polyethylene noncircular fine fibers, and pulp-like fibers in which the polypropylene noncircular fine fibers and the high density polyethylene noncircular fine fibers were bound to each other. Further, the polypropylene based high-strength composite fibers described in Example 1 were prepared.

A wet-laid fiber web was formed and the fusing treatment was carried out by repeating the procedures described in Example 1, except that a slurry was prepared by mixing and dispersing a 20 mass % of the polypropylene superfine fibers, 40 mass % (as fibers) of the slurry mixture, and 40 mass % of the polypropylene based high-strength composite fibers, to obtain a fused nonwoven fabric.

The fused nonwoven fabric was calendered under a linear pressure of 9.8 N/cm, dipped in a solution of fuming sulfuric acid (15% SO$_3$) for 2 minutes at 60° C., thoroughly washed with water, and dried to obtain a sulfonated separator (surface density=40 g/m$^2$; thickness=0.1 mm).

Example 4

The preparation of a wet-laid fiber web, the fusing treatment, the calendaring treatment, and the treatment with fluorine gas described in Example 1 were carried out, except that a slurry was prepared by mixing and dispersing a 15 mass % of the polypropylene superfine fibers, 20 mass % (as fibers) of the slurry mixture, and 65 mass % of the polypropylene based high-strength composite fibers, to obtain a separator (surface density=40 g/m$^2$; thickness=0.1 mm).

Example 5

The preparation of a wet-laid fiber web, the fusing treatment, the calendaring treatment, and the treatment with fluorine gas described in Example 1 were carried out, except that a slurry was prepared by mixing and dispersing a 10 mass % of the polypropylene superfine fibers, 30 mass % (as fibers) of the slurry mixture, and 60 mass % of the polypropylene based high-strength composite fibers, to obtain a separator (surface density=40 g/m$^2$; thickness=0.1 mm).

Comparative Example 3

The wet-laid fiber web was prepared by repeating the procedures described in Example 1.

The wet-laid fiber web was mounted on a net (linear wire diameter=0.15 mm), and then the dividable composite fibers were divided with a water jet from a nozzle plate (nozzle diameter=0.13 mm, pitch=0.6 mm, pressure=10.2 MPa) to form a divided fiber web. In this case, each side of the fiber web was treated with the water jet in turn, and the treatment was repeated twice.

The fusing treatment of the polypropylene based high-strength composite fibers, the calendaring treatment, and the treatment with fluorine gas described in Example 1 were carried out to obtain a separator (surface density=40 g/m$^2$; thickness=0.1 mm).

Comparative Example 4

The polypropylene superfine fibers described in Example 1 and the slurry mixture described in Example 1 were prepared. Further, polypropylene based composite fibers (fiber diameter=10.6 μm, fiber length=5 mm, Young's modulus=38 cN/dtex, rate of heat shrinkage=7%, tensile strength=4.2 cN/dtex) having a core component of polypropylene (melting point=165° C.) and a sheath component of high density polyethylene (melting point=135° C.) was prepared.

The preparation of a wet-laid fiber web, the fusing treatment, the calendaring treatment, and the treatment with fluorine gas described in Example 1 were carried out, except that a slurry was prepared by mixing and dispersing a 20 mass % of the polypropylene superfine fibers, 15 mass % (as fibers) of the slurry mixture, and 65 mass % of the polypropylene based composite fibers, to obtain a separator (surface density=40 g/m$^2$; thickness=0.1 mm).

Evaluation (Measurement of Mean Flow Pore Size)

The mean flow pore size of each separator was measured in accordance with a mean-flow point method, using a porometer (Coulter). The measurement was carried out five times with respect to each separator, and the average calculated was regarded as the mean flow pore size. The result was as shown in Table 1.

(Measurement of Maximum Pore Size)

The maximum pore size of each separator was measured in accordance with a bubble point method using a porometer (Coulter). The measurement was carried out five times with respect to each separator, and the average calculated was regarded as the maximum pore size. The result was as shown in Table 1.

(Measurement of Ratio of Maintained Thickness)

The thickness of each separator at a load of 200 g ($T_{200}$) was measured by a micrometer (diameter of a spindle=6.35 mm). Then, the thickness of each separator at a load of 1000 g ($T_{1000}$) was measured by the micrometer. The percentage of the thickness at a load of 1000 g ($T_{1000}$) to the thickness at a load of 200 g ($T_{200}$) was calculated and regarded as the ratio of maintained thickness (Tr). The measurement was carried out four times with respect to each separator, and the average calculated was regarded as the ratio of maintained thickness. The result was as shown in Table 1.

$$Tr=(T_{1000}/T_{200})\times 100$$

(Measurement of Capacity for Holding a Liquid Under Pressure)

Each separator was cut to samples having a diameter of 30 mm. Each of the samples was allowed to stand at 20° C. and a relative humidity of 65% to a moisture equilibrium, and then a mass ($M_0$) thereof was measured. Then, each of the samples was dipped in an aqueous potassium hydroxide solution having a specific gravity of 1.3 (20° C.) for 1 hour, to replace air in the sample with the aqueous potassium hydroxide solution, and the aqueous potassium hydroxide solution was maintained in the sample. Thereafter, each of the samples was placed between two sets of three filter papers (diameter=30 mm), and a pressure of 5.7 Mpa was applied for 30 seconds by a pressure pump, and a mass ($M_1$) thereof was measured. A holding capacity of liquid under pressure (HCUP) was calculated by the following equation:

$$HCUP(\%) = [(M_1 - M_0)/M_0] \times 100$$

The measurements were conducted 4 times for each separator, and an average was calculated as the holding capacity of liquid under pressure. The result is shown in Table 1.

(Evaluation of Ratio of Non-Conforming Batteries Produced During the Battery Assembly)

As a current collector of a battery, a paste nickel positive electrode (width=41 mm, length=70 mm) prepared from a foamed nickel base, and a paste hydrogen-occluded alloy negative electrode (misch metal alloy, width=40 mm, length=100 mm) were formed.

Each of the separators prepared in Examples 1 to 5 and Comparative Examples 1 to 4 was cut into a separator sample (width=42 mm; length=176 mm). The separator sample was sandwiched between the positive and negative electrodes and rolled into a voluted form to obtain 10,000 electrodes. During the process, a ratio of non-conforming batteries in which a short circuit was caused by a tear in the separator by an edge of an electrode or a penetration into the separator by a flash at the electrode was regarded as the ratio of non-conforming batteries produced during the battery assembly. The result is shown in Table 1.

(Test of Cycle Lifetime)

As a current collector of electrodes, a paste nickel positive electrode (width=41 mm, length=70 mm) prepared from a foamed nickel base, and a paste hydrogen-occluded alloy negative electrode (misch metal alloy, width=40 mm, length=100 mm) were formed.

Each of the separators prepared in Examples 1 to 5 and Comparative Examples 1 to 4 was cut into a separator sample (width=42 mm; length=176 mm). The separator sample was sandwiched between the positive and negative electrodes and rolled into a voluted form to obtain electrodes. The electrodes were put into an outer container, 5N potassium hydroxide and 1N lithium hydroxide were poured in as electrolytes, and the container was sealed to obtain a cylindrical nickel-hydrogen battery (AA 1600 mAh).

After each cylindrical nickel-hydrogen battery was activated, a charging-discharging cycle consisting of charging at 0.1 C to 120%, resting for 15 minutes, and discharging at a discharge rate of 0.2 C to a final voltage of 0.8 V was repeated, to determine a charging-discharging lifetime (i.e., number of cycles) when the discharging capacity was lowered to less than 80% of the initial capacity. The measurement was carried out ten times for each separator, and an average calculated. The result was as shown in Table 1.

TABLE 1

| | A (g/m²) | B (mm) | C (μm) | D (μm) | E (%) | F (%) | G (%) | H (Cycles) |
|---|---|---|---|---|---|---|---|---|
| Example 1 | 40 | 0.1 | 9 | 13 | 90 | 8.7 | 0.05 | 620 |
| Example 2 | 40 | 0.1 | 9 | 25 | 91 | 8.2 | 0.08 | 550 |
| Example 3 | 40 | 0.1 | 6 | 10 | 89 | 9.5 | 0.02 | 700 |
| Example 4 | 40 | 0.1 | 9 | 15 | 90 | 8.5 | 0.06 | 600 |
| Example 5 | 40 | 0.1 | 10 | 18 | 90 | 7.8 | 0.08 | 580 |
| Comparative Example 1 | 40 | 0.1 | 7 | 18 | 84 | 6.3 | 0.1 | 450 |
| Comparative Example 2 | 40 | 0.1 | 8 | 22 | 80 | 8.3 | 0.2 | 430 |
| Comparative Example 3 | 40 | 0.1 | 12 | 38 | 89 | 8.0 | 0.22 | 420 |
| Comparative Example 4 | 40 | 0.1 | 9 | 13 | 78 | 7.9 | 0.18 | 400 |

[A: Mass per unit area, B: Thickness, C: Mean flow pore size, D: Maximum pore size, E: ratio of maintained thickness, F: Capacity for holding a liquid under pressure, G: Ratio of non-conforming batteries, and H: Cycle lifetime]

Comparing Examples 1 and 2 with Comparative Example 1, the separator containing the noncircular fine fibers exhibits a high ratio of maintained thickness, and thus exhibits a high capacity for holding a liquid under pressure. Because of the high ratio of maintained thickness, a transformation by a pressure applied when a battery is assembled does not easily occur, and thus the separator exhibits a low ratio of non-conforming batteries. Further, because the shape of the separator can be maintained against an expansion or contraction of electrodes during a charging or discharging, an electrolyte can be held, and a smooth electromotive reaction can be performed. Furthermore, the separator can maintain insulating properties and is capable of effectively preventing a short circuit, and thus, a battery having a long lifetime can be prepared.

Comparing Examples 1 and 2 with Comparative Example 2, the separator containing the superfine fibers exhibits a high ratio of maintained thickness, and a transformation by a pressure applied when a battery is assembled does not easily occur, and thus the separator exhibits a low ratio of non-conforming batteries. Further, because the shape of the separator can be maintained against an expansion or contraction of electrodes during a charging or discharging, an electrolyte can be held, and a smooth electromotive reaction can be performed. Furthermore, the separator can maintain insulating properties and is capable of effectively preventing a short circuit, and thus, a battery having a long lifetime can be prepared.

Comparing Example 1 with Example 2, the separator in which the fibers are not entangled by a water jet has a small maximum pore size and an excellent denseness, and thus exhibits a high capacity for holding a liquid under pressure and a low ratio of non-conforming batteries. Further, an electrolyte can be held, and a smooth electromotive reaction can be performed. Furthermore, the separator can maintain insulating properties and is capable of effectively preventing a short circuit, and thus, a battery having a long lifetime can be prepared.

Comparing Example 2 with Comparative Example 3, the separator of the present invention having a maximum pore size of 25 μm or less can avoid a short circuit when the separator is wrapped around the electrodes, and a battery having a long lifetime can be prepared.

Comparing Example 1 with Comparative Example 4, the separator of the present invention containing the polypropylene based high-strength composite fibers exhibits a high ratio of maintained thickness, and thus, can avoid a short circuit when the separator is wrapped around the electrodes, and a battery having a long lifetime can be prepared.

As above, the present invention was explained with reference to particular embodiments, but modifications and

The invention claimed is:

1. A battery separator comprising a nonwoven fabric, wherein said nonwoven fabric contains:
   (1) superfine fibers having a fiber diameter of 3 μm or less,
   (2) noncircular fine fibers having a noncircular cross-sectional shape and having a fiber diameter of 3 to 5 μm (excluding 3 μm), said fiber diameter meaning a diameter of a circle having an area the same as that of the noncircular cross-sectional shape, and
   (3) polypropylene based high-strength composite fibers containing a fusible component on the surface thereof and having a tensile strength of 4.5 cN/dtex or more, and the fusible components contained in the polypropylene based high-strength composite fibers are fused;
   wherein said battery separator has a maximum pore size of 25 μm or less and a ratio of maintained thickness of at least 85%.

2. The battery separator according to claim 1, wherein the superfine fiber has a circular cross-sectional shape.

3. The battery separator according to claim 1, wherein the superfine fiber is formed from an island component remaining after removing a sea component from an islands-in-sea type composite fiber.

4. The battery separator according to claim 1, wherein the noncircular fine fibers are selected from a group comprising polypropylene noncircular fine fibers, polyethylene noncircular fine fibers, ethylene-vinyl alcohol copolymer noncircular fine fibers, and combinations thereof.

5. The battery separator according to claim 1 additionally containing pulp-like fibers, wherein the pulp-like fibers are bound to at least two or more of the noncircular fine fibers and the noncircular fine fibers are of different resin compositions.

6. The battery separator according to claim 1, wherein the nonwoven fabric consists essentially of polyolefin-based fibers.

7. The battery separator according to claim 6 wherein the polyolefin-based fibers comprise functional groups selected from the group consisting of oxygen-containing groups, sulfur-containing groups, and combinations thereof.

8. The battery separator according to claim 7 wherein the functional groups selected from the group consisting of sulfonyl fluoride, sulfonic acid, and combinations thereof.

9. The battery separator according to claim 1, wherein the separator has a thickness of 0.1 mm or less.

10. The battery separator according to claim 1, wherein the superfine fibers account for 24 mass % or less of the nonwoven fabric.

11. The battery separator according to claim 1, wherein the separator has a mean flow pore size of 5 to 13 μm.

12. The battery separator according to claim 1, wherein the separator has a capacity for holding a liquid of 7% or greater the mass of the separator under a pressure of 5.7 Mpa.

13. The battery separator according to claim 1 wherein the superfine fibers and noncircular fine fibers each have a length of 0.1 mm to 25 mm.

14. The battery separator according to claim 1 wherein the noncircular fine fibers are formed from polyamide-based resins.

15. The battery separator according to claim 1 wherein the polypropylene based high-strength composite fibers comprise an isotactic polypropylene homopolymer.

16. The battery separator according to claim 1 comprising two or more polypropylene based high-strength composite fibers differing from one another with respect to fiber diameter or fiber length.

17. A battery comprising the battery separator according to claim 1.

18. A battery separator comprising a nonwoven fabric, wherein said nonwoven fabric contains
   (1) superfine fibers having a fiber diameter of 3 μm or less,
   (2) noncircular fine fibers having a noncircular cross-sectional shape and having a fiber diameter of greater than 3 μm and less than or equal to 5 μm, said fiber diameter meaning a diameter of a circle having an area the same as that of the noncircular cross-sectional shape,
   (3) polypropylene based high-strength composite fibers having a tensile strength of 4.5 cN/dtex or more, and
   (4) a binder disposed on the surface of said polypropylene based high-strength composite fibers, said binder holding said polypropylene based high-strength composite fibers in a rigid matrix, said binder consisting of a polymer having a melting point at least 20° C. lower than the melting point of said polypropylene based high-strength composite fibers;
   wherein said battery separator has a maximum pore size of 25 μm or less and a ratio of maintained thickness of at least 85%.

19. The battery separator according to claim 18 wherein the superfine fibers and noncircular fine fibers each have a length of 0.1 mm to 25 mm.

20. The battery separator according to claim 18 comprising two or more polypropylene based high-strength composite fibers differing from one another with respect to fiber diameter or fiber length.

* * * * *